(12) United States Patent
Miyazawa

(10) Patent No.: US 6,752,037 B1
(45) Date of Patent: Jun. 22, 2004

(54) TOOL CONNECTING DEVICE FOR ROBOT HAND

(75) Inventor: Hiroshi Miyazawa, Akashi (JP)

(73) Assignee: Pascal Engineering Corporation, Hyogo (JP)

(*) Notice: Subject to any disclaimer, the term of this patent is extended or adjusted under 35 U.S.C. 154(b) by 73 days.

(21) Appl. No.: 10/088,068
(22) PCT Filed: Jul. 6, 2000
(86) PCT No.: PCT/JP00/04563
§ 371 (c)(1),
(2), (4) Date: Jun. 18, 2002
(87) PCT Pub. No.: WO02/04177
PCT Pub. Date: Jan. 17, 2002

(51) Int. Cl.⁷ .............................................. B25J 15/04
(52) U.S. Cl. ................................ 74/490.01; 403/322.1
(58) Field of Search ....................... 74/490.01; 403/321, 403/322.1, 322.3; 483/DIG. 901; 901/28, 29

(56) References Cited

U.S. PATENT DOCUMENTS

| | | | | |
|---|---|---|---|---|
| 4,138,148 A | * | 2/1979 | Zaremba | 285/317 |
| 4,277,875 A | * | 7/1981 | Worrell | 29/253 |
| 4,500,065 A | * | 2/1985 | Hennekes et al. | 248/542 |
| 4,636,135 A | * | 1/1987 | Bancon | 414/730 |
| 4,696,524 A | | 9/1987 | Cloyd | |
| 5,294,209 A | * | 3/1994 | Naka et al. | 403/24 |
| 5,520,476 A | * | 5/1996 | Marks et al. | 403/322.3 |
| 6,375,378 B1 | * | 4/2002 | Kitaura | 403/31 |

FOREIGN PATENT DOCUMENTS

| | | |
|---|---|---|
| JP | 59188184 | 12/1984 |
| JP | 61117087 | 6/1986 |
| JP | 00343174 | 2/1991 |
| JP | 4-63688 | 2/1992 |
| JP | 00642091 | 6/1994 |
| WO | PCTJP0004563 | 1/2000 |

OTHER PUBLICATIONS

Patent Abstract of Japan for JP–4–63688 published on Feb. 28, 1992.

* cited by examiner

Primary Examiner—David A. Bucci
Assistant Examiner—Timothy McAnulty
(74) Attorney, Agent, or Firm—Darby & Darby (57) ABSTRACT

A robot hand tool linkage device includes a locking mechanism and an actuation shaft driven between a lock position and a release position. A piston moves an actuation shaft upward and downward to cam outward a plurality push rods urging outward a plurality arc-shaped locking members. The locking members are captured under an arcuate surface of a tool plate which is thereby attached. A resilient member engages an outer groove in each of the locking members to urge them inward. When the outward force on the locking members is released, the resilient member moves the locking members inward to reduce their combined diameter sufficiently to disengage from the arcuate surface, and thereby to release the tool plate.

5 Claims, 6 Drawing Sheets

TOOL CONNECTING DEVICE FOR ROBOT HAND

BACKGROUND OF THE INVENTION

1. Background of the Invention

The present invention relates to a tool linkage device for a robot hand. In particular, the present invention relates to a robot hand tool linkage device in which a plurality of radially provided rod members act as joining members for a locking mechanism which reliably connects a master plate and a tool plate.

2. Description of the Related Art

A robot hand tool linkage device selectively attaches and detaches several types of tools from a hand output part of a robot hand. Generally, robot hand tool linkage devices have an inner assembly (master plate) that is attached to a hand output part of a robot hand, an outer assembly (tool plate) onto which a tool is attached, and a locking mechanism which locks the inner assembly and outer assembly.

U. S. Pat. No. 4,696,524 discloses a robot hand tool linkage device that can rapidly connect and disconnect an inner assembly and an outer assembly. The locking mechanism for this robot hand tool linkage device has a piston member, a plurality of ball members acting as the joining members, and a ball receiver as a latching part.

The piston member is supported by the inner assembly and is slidable from a lock position to a lock release position. The ball member is housed and retained in a housing hole of an approximately cylindrical ball retainer which surrounds the outer perimeter of the output part of the piston member connected to the inner assembly.

The ball member can move in a direction which is perpendicular to the sliding direction of the piston member (henceforth referred to as the perpendicular direction). Consequently, with the housing hole of the ball retainer, its inner diameter side and outer diameter side are linked in the perpendicular direction, and the ball member moves in the perpendicular direction inside the housing hole.

The ball receiver is provided on the outer assembly. The ball receiver contacts the ball member on its tapered surface. During operation, when the piston member moves to the lock position, the ball receiver cooperates with the ball members to connect the inner assembly and the outer assembly.

For the ball retainer, a plurality of flat springs are provided along the outer perimeter surface of the ball retainer excluding the housing holes. Particularly when the inner assembly and outer assembly are being disconnected, the ends of adjacent flat springs assist in preventing the loss of ball members and urge the ball members toward the inner diameter of the ball retainer.

Japanese Laid-Open Patent Number 4-63688 provides a robot hand tool linkage device wherein a plurality of flat springs are on the outer perimeter surface of the ball retainer. The loss of ball members from the ball retainer is prevented by these flat springs.

Unfortunately, according to the robot hand tool linkage device described above, a plurality of flat springs are required to prevent the loss of ball members by impelling the ball members toward the inner diameter of the ball retainer. As a further detriment, the above designs require a large number of parts, and the structure is detrimentally complex, leading to higher manufacturing costs.

Since ball members are used as joining members, there is point contact or line contact between the spherical surface of the ball member and the flat surface of the ball receiver. The actual contact surface area is detrimentally small resulting in adversely high contact surface pressure.

Additionally, since the structure has a plurality of ball members placed along the entire perimeter, the contact parts between the ball member and the ball receiver is present only intermittently along the entire perimeter, and the contact surface pressure of the locking mechanism, as a whole, is detrimentally high. This high contact surface pressure results in substantially shortened mechanical life and reduces reliability.

OBJECTS AND SUMMARY OF THE INVENTION

It is an object of the present invention to provide a tool linkage device for a robot hand which overcomes the drawbacks of the related art described above.

It is another object of the present invention to provide a robot hand tool linkage device that reliably prevents the loss of the joining member, reduces the number of parts, simplifies the structure and design, reduces contact pressure between operable parts, maintains low manufacturing costs, and increases the durability of the device while retaining operational effectiveness.

The present invention relates to a robot hand tool linkage device that is equipped with a master plate that is connected to the output part of a robot hand, a tool plate onto which a tool is connected, and a locking mechanism that releasably locks the master plate and tool plate.

In particular, with the robot hand tool linkage device of the present invention, the locking mechanism comprises: an actuation shaft that is supported by the master plate and is driven between a lock position and a release position by an air cylinder inside the master plate; a ring-shaped retainer that is affixed to the master plate and that surrounds an outer perimeter of an output part of the actuation shaft; a plurality of rod insertion holes that are formed in an inner perimeter wall of the retainer and are formed penetrating in a radial direction that is perpendicular to a sliding direction of the actuation shaft; a ring-shaped groove that is formed on the retainer on an outer perimeter side of the plurality of rod insertion holes and that is formed with the outer perimeter side open; a plurality of push rods that are attached movably in the plurality of rod insertion holes and that transfer the output of the actuation shaft radially outward; and a plurality of arc-shaped locking members that are attached in a manner allowing for sliding in a radial direction in the ring-shaped groove and that are in contact with or are coupled with the ends of the push rods.

With this robot hand tool linkage device, when connecting the tool plate and the master plate, after positioning the master plate and the tool plate and forming a temporary connection, an actuator shaft is moved to a lock position by an air cylinder. Thereupon, each push rod is pushed radially outward, and a plurality of arc-shaped locking members slides radially outward where it and joins with the tool plate. With this, the tool plate and the master plate are securely locked. When releasing the connection between the tool plate and the master plate, the actuator shaft is moved to a lock release position by the air cylinder. Thereupon, the plurality of arc-shaped locking members moves to a smaller radius, and each push rod moves radially inward. Afterwards, when the pin connections and the like between the tool plate and the master plate are released, the connection between the tool plate and the master plate is completely released.

Other preferred constructions for the present invention are described in the preferred embodiments of the present invention.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Referring to FIGS. 1–4, a tool linkage device 1 for a robot hand includes a master plate 2 that connects to an output part H of a robot hand (not shown), a tool plate 3, a locking mechanism which releasably locks together master plate 2 and tool plate 3 and an air cylinder 7. During operation, one tool (not shown) from the multitude of possible tools (not shown) is connected to tool plate 3.

Master plate 2 includes a master plate body 5 and a lid part 6. Master plate body 5 is approximately cylindrical. A lid part 6 is affixed to an upper end of master plate body 5.

A cylinder hole 8 of air cylinder 7 is formed in an upper half of master plate body 5. A retainer joining hole 9, which is larger in diameter than cylinder hole 8, is formed on a lower half of master plate body 5. A connector 10, for securing electric wires (not shown) that power sensors and switches (not shown) on the tool (not shown) is provided at a side of master body plate 5.

Air cylinder 7 is located in master plate 2. A piston member 13, of air cylinder 7, is fitted in a sealed and slidable manner in cylinder hole 8. Sets of seal members 11 and 12 retain pressure in air cylinder 7, during operation. Seal member 13a slidably seals seal member 13 to cylinder hole 8.

An actuator shaft 14 is affixed to a lower end of piston member 13. Actuator shaft 14 extends-downwards and away from piston member 13. During operation, actuator shaft 14 is raised and lowered by air cylinder 7 from a lock position (shown in FIG. 1) to a release position (shown in FIG. 2), as will be described.

A first actuation chamber 8a, is formed in cylinder hole 8 in the lock position, between piston member 13 and lid part 6.

A connection fitting 16A, threadably joins master plate body 5, for supplying and releasing pressurized air to first actuation chamber 8a via a passage hole 15.

A second actuation chamber 8b consists of a lower part of cylinder hole 8 and an annular depression 17a in retainer 17. A connection fitting 16B, threadably joined to master plate body 5, supplies and releases pressurized air from actuation chamber 8b through a passage hole 15. In operation, pressurized air from a pressurized air supply source (not shown) is supplied to and released from air cylinder 7 by respective air hoses (not shown), connection fittings 16A, 16B, and passage holes 15.

Tool plate 3 consists of an approximately cylindrical tool plate body 3a and a ring-shaped joining ring 21, together with other elements. Ring-shaped joining ring 21 is placed inside a step part formed in the inner perimeter of the upper half of tool plate body 3a. Joining ring 21 is affixed to tool plate body 3a by a plurality of bolts 22. The inner surface of joining ring 21 includes a tapered joining surface 21a in which the inner diameter becomes smaller toward the top and a cylindrical surface 21b which extends downward from the lower end of tapered joining surface 21a. A plurality of tapered pin holes 21c capable of joining with a plurality of tapered pins 28 (refer to FIG. 3) are formed on joining ring 21. A connector 23 for the electric wires that power the sensors and switches of the tool and which connects with connector 10 is affixed to tool plate body 3a.

In order to supply pressurized fluid of two systems, for example, of pressurized air and hydraulic pressure and the like to the tool side from the robot side, as shown in FIGS. 1–4, for example, four connection fittings 24A–24D are provided near the outer surface of master plate body 5. Four connection fittings 25A–25D (only 25B, 25C are shown) corresponding to four connection fittings 24A–24D are provided near the outer surface of tool plate body 3a. When master plate 2 and tool plate 3 are connected, the upper and lower fluid passages are connected via a passage 26.

Referring to FIGS. 1, 2, and 5–11, locking mechanism 4 has an actuator shaft 14 that is raised and lowered by air cylinder 7, a ring-shaped retainer 17, four rod insertion holes 18, a ring-shaped groove 31, four push rods 19, and four arc-shaped locking members 20.

The upper half of retainer 17 fits inside retainer joining hole 9 of master plate body 5. Retainer 17 is secured to master plate body 5 by a plurality of bolts. Retainer 17 includes a plurality of tapered pins 28 that can fit into a plurality of pin holes 21c of joining ring 21. On the inner perimeter side of the upper half of retainer 17, a guide cylinder 29 that is formed in the shape of a cylinder surrounds the outside of the output part of actuation shaft 14. A seal member 30 is also provided on guide cylinder part 29.

A ring-shaped groove 31 on the lower half of retainer 17 is open on the outer perimeter side. A ring-shaped wall 17b is formed below ring-shaped groove 31, and an inner perimeter wall 17c is formed to the inside of ring-shaped groove 31. Inner perimeter wall 17c is a unitary continuation of guide cylinder 29. Four rod insertion holes 18 are formed on inner perimeter wall 17c, passing in a radial direction that is perpendicular to the sliding direction of actuator shaft 14.

Rod insertion holes 18 are formed at 90 degree intervals along the circumference. The outer perimeter end of ring-shaped wall 17b is slightly smaller in diameter than the inner perimeter surface of joining ring 21.

A push rod 19 is carried in each rod insertion hole 18 free to move in the radial direction described above. In addition, push rod 19 is constructed so that the output of actuator shaft 14 is transmitted radially outward.

Referring to FIGS. 5–8, an inner end 19a of each push rod 19, which receives the output of actuator shaft 14, is a partial sphere. On the outer perimeter part of push rod 19, four grease grooves 19b are formed in the radial direction at 90 degree intervals around the circumference.

Referring to FIGS. 1,2, 6 and 9–11, four arc-shaped locking members 20 are attached to ring-shaped groove 31 in a manner that allows for sliding in the radial direction. A depression 20e is formed near the center of the arc in the inner perimeter part of each arc-shaped locking member 20. The outer end of each push rod 19 loosely fits into a depression 20e. The outer end of each push rod contacts depression 20e. An arc groove 20a is formed on the outer perimeters of each of the four arc-shaped locking members 20. A C-ring shaped spring member 32 is fitted into arc grooves 20a. The four arc-shaped locking members are elastically urged toward a smaller radius by spring member 32. A fastening hole 20b on one of the four arc-shaped locking members 20 fastening spring member 32 to its outer perimeter.

An arc-shaped joining surface 20c is formed near the outer perimeter of each arc-shaped locking member 20. Arc-shaped joining surface 20c can join with tapered joining surface 21a of joining ring 21 and has a smaller radius toward the top. When actuation shaft 14 is at the lock position shown in FIG. 2, arc-shaped joining surfaces 20c of the four arc-shaped locking members 20 are in surface contact with and joins with tapered joining surface 21a. When actuation shaft 14 is in the release position shown in FIG. 1, arc-shaped joining surface 20c has a smaller radius than tapered joining surface 21a, thus permitting arc-shaped joining surface 20c to separate from tapered joining surface 21a. A plurality of grease grooves 20d are formed on the upper and lower surfaces of each arc-shaped locking member 20. Grease grooves 20d are formed at an equal spacing, and they extend a set length in the radial direction from the inner edge to the outer edge.

Although not shown in the figures, master plate 2 is coupled in advance with output part H of a robot hand. The desired tool is coupled in advance with tool plate 3. Linkage tool plate 3 and master plate 2, using the robot hand, are brought closer together. Their shaft centers and phases are aligned aided by engagement between the plurality of taper pins 28 on master plate 2 and the plurality of tapered pin holes 21c on tool plate 3. Thus, master plate 2 and tool plate 3 are positioned to form a temporary linkage.

Figure 2:
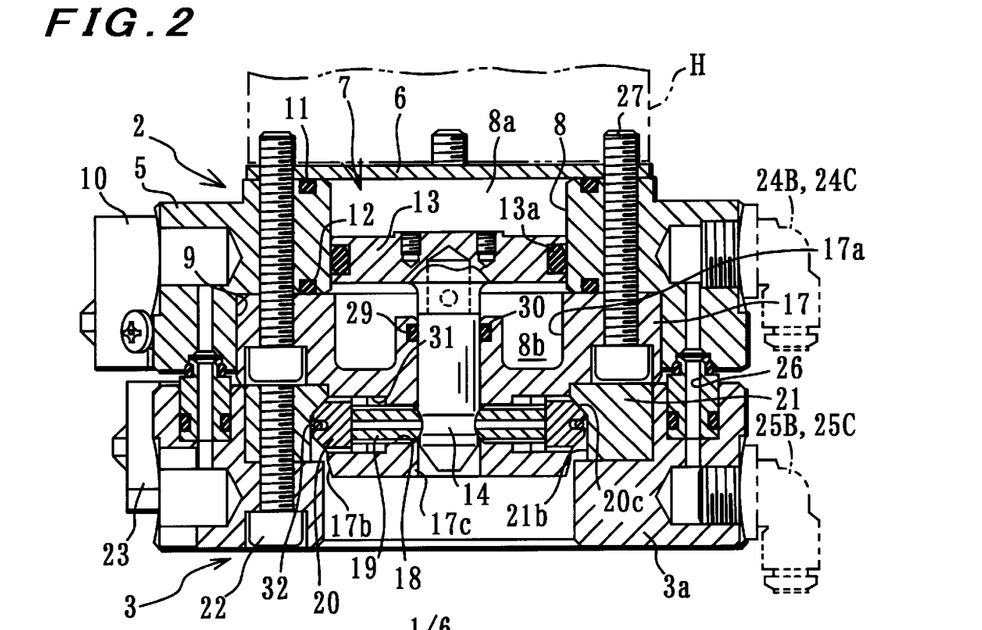
FIG. 2 is a partial cross-section of a tool linkage device in an actuation state of the locking mechanism.
Figure 3:
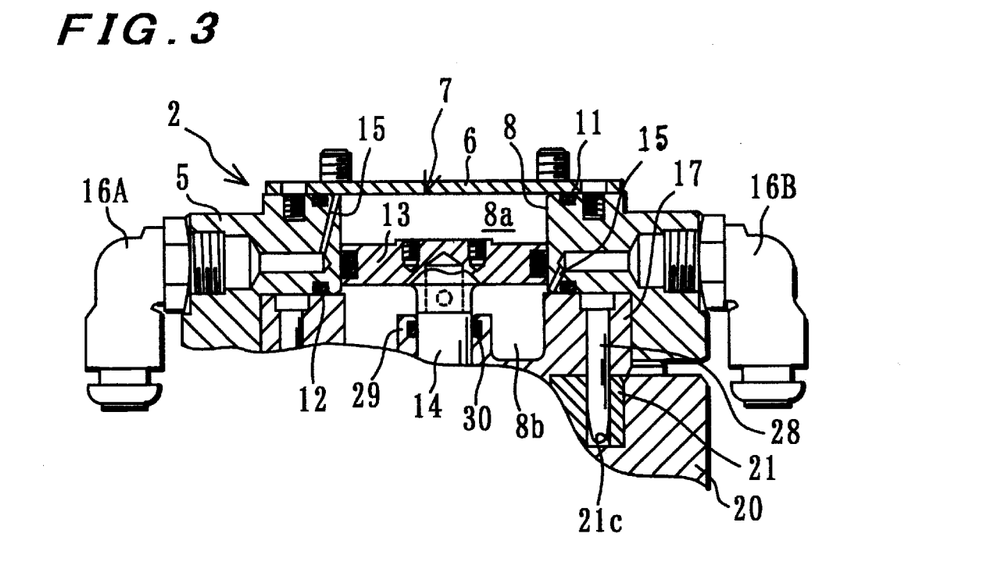
FIG. 3 is a partial longitudinal cross-section of a different phase of the tool linkage device.
Figure 4:
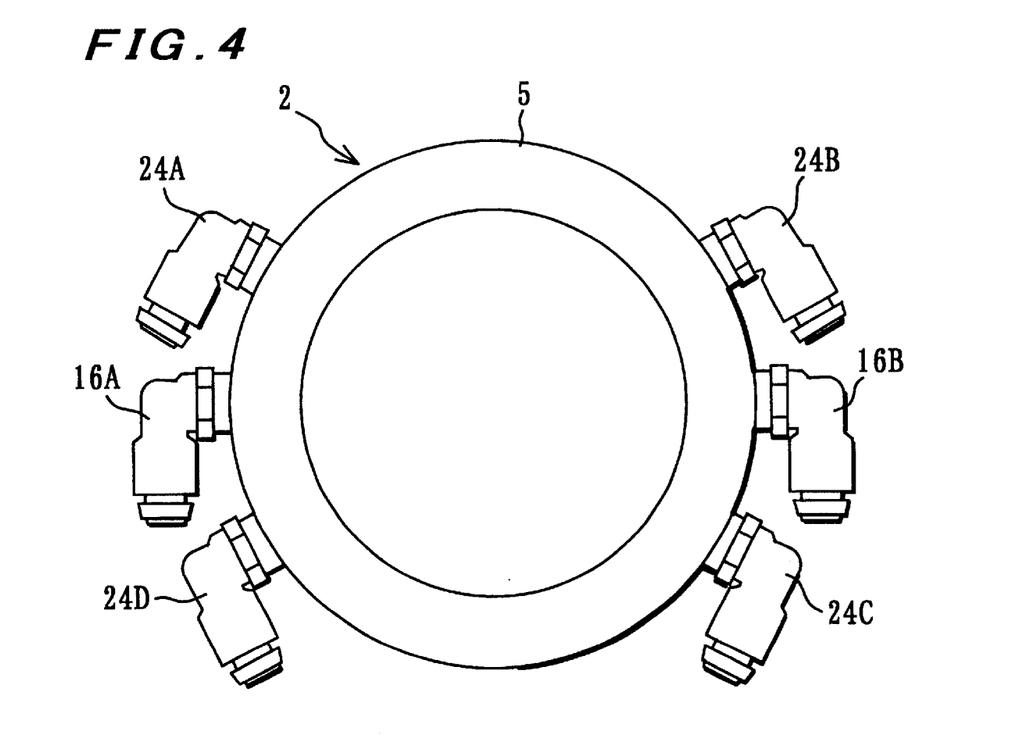
FIG. 4 is a longitudinal section of a different phase of the tool linkage device.
Figure 6:
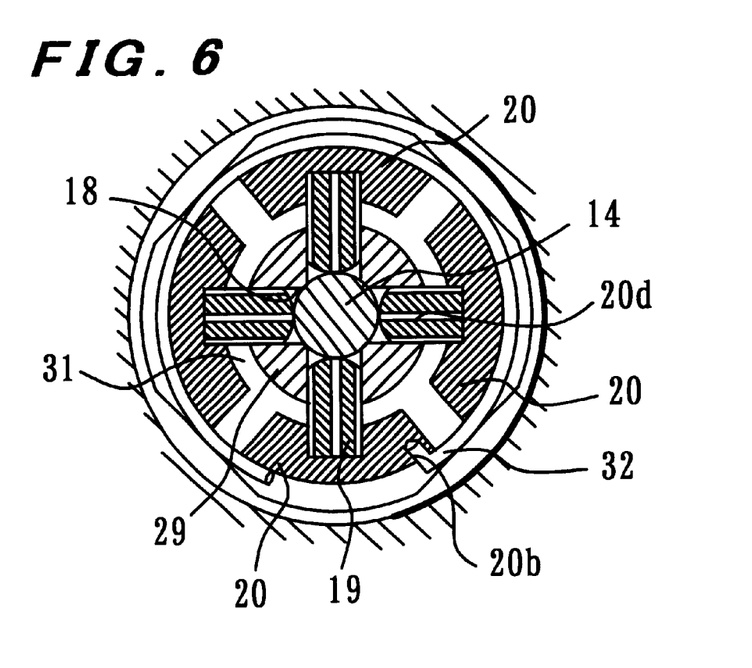
FIG. 6 is a horizontal section with the actuator shaft in a lock position.
Figure 7:
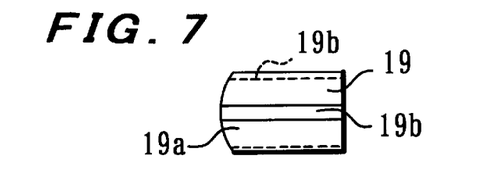
FIG. 7 is a plan view of a push rod.
Figure 8:
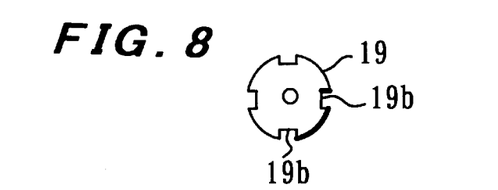
FIG. 8 is a front view of a push rod.
Figure 9:
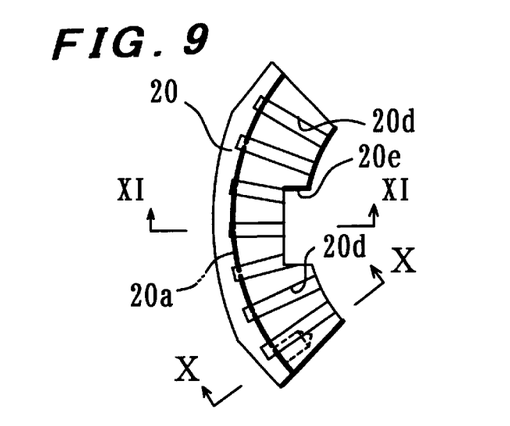
FIG. 9 is a partial expanded plan view of an arc-shaped locking member.
Figure 10:
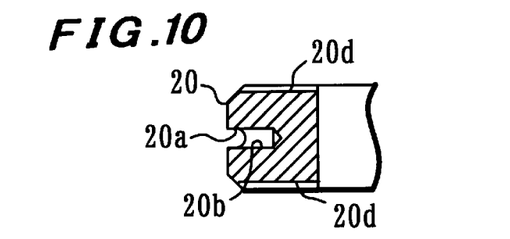
FIG. 10 is a cross-section along line X—X of FIG. 9.
Figure 11:
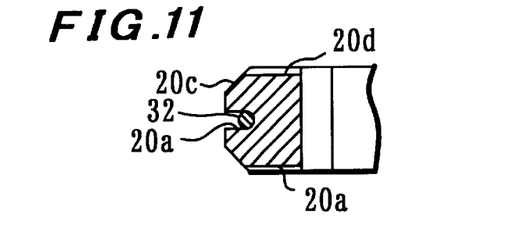
FIG. 11 is a cross-section along line XI—XI of FIG. 9.
Figure 12:
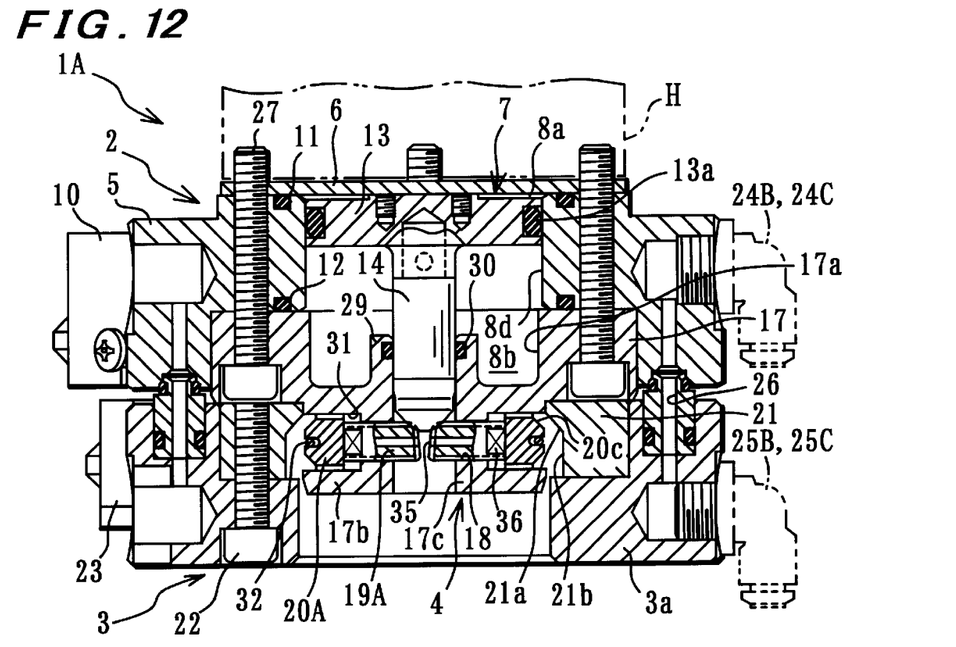
FIG. 12 is a longitudinal section of a tool linkage device in an alternative embodiment of the present invention.
Figure 13:
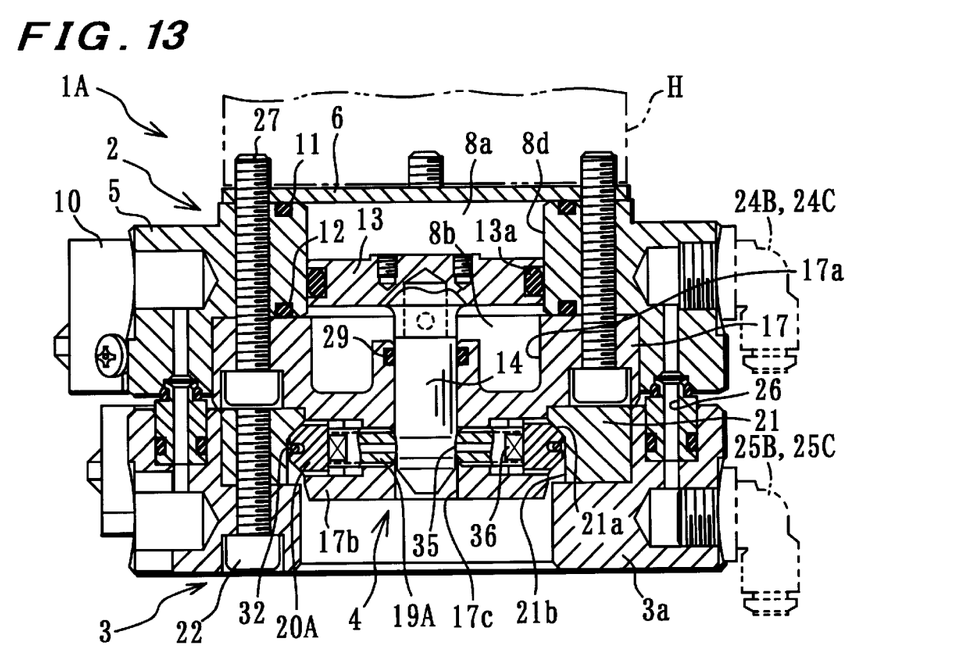
FIG. 13 is a longitudinal section of FIG. 12 in an actuation state of the locking mechanism.
Figure 14:
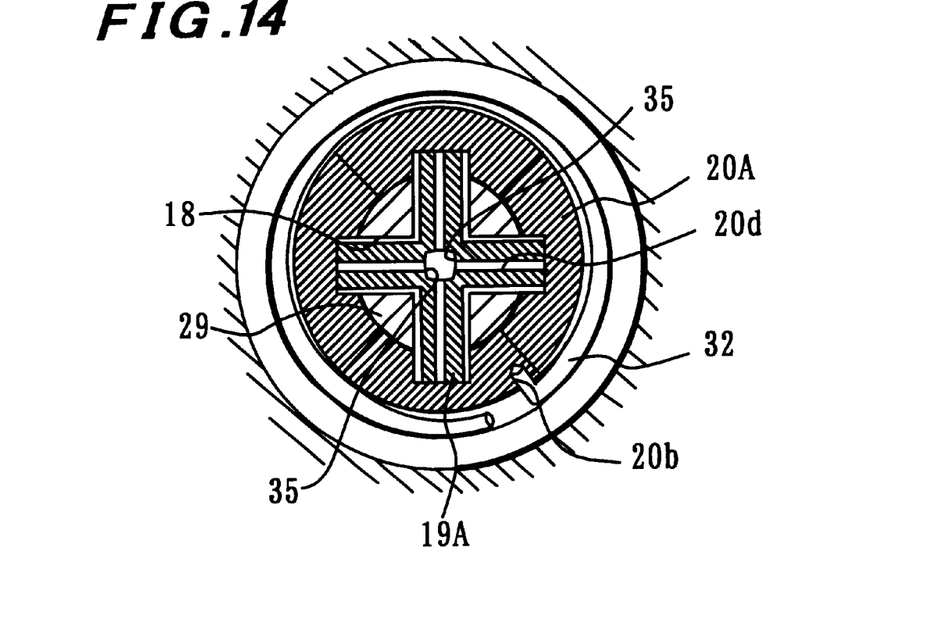
FIG. 14 is a horizontal section of the actuator shaft in a release position.
Figure 15:
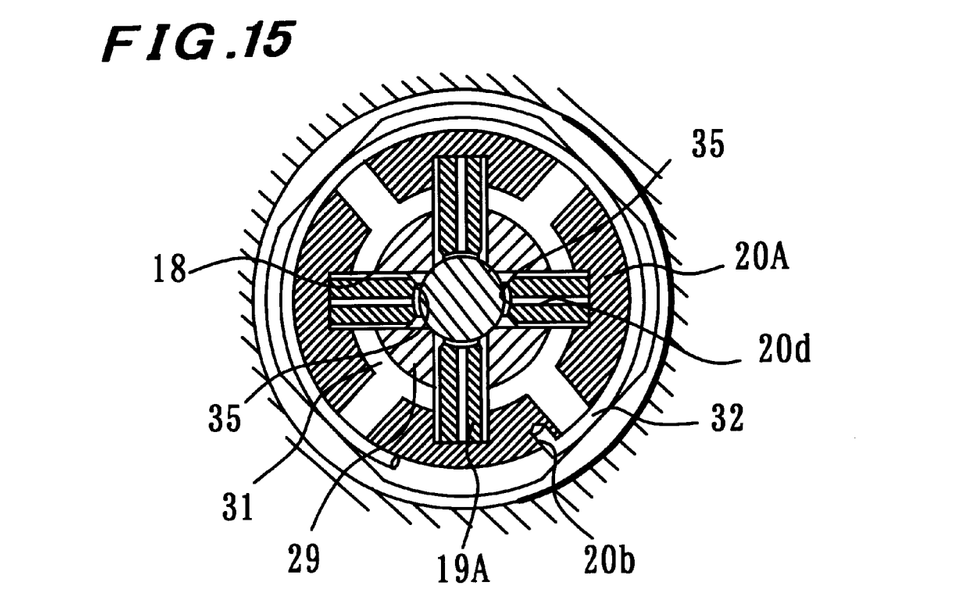
FIG. 15 is a horizontal section with the actuator shaft in a lock position.

Next, referring to FIGS. 2 and 6, while releasing the air inside actuation chamber 8b, pressurized air is introduced inside actuation chamber 8a. This lowers and piston member 13 and actuation shaft 14 to the lock position. Thereupon, each push rod 19 is pushed outward in the radial direction by actuation shaft 14, and the four arc-shaped locking members 20 slide radially outward. Each of the arc-shaped joining surfaces 20c joins with the tapered joining surface 21a of joining ring 21. As a result, tool plate 3 is securely locked to master plate 2.

Figure 1:
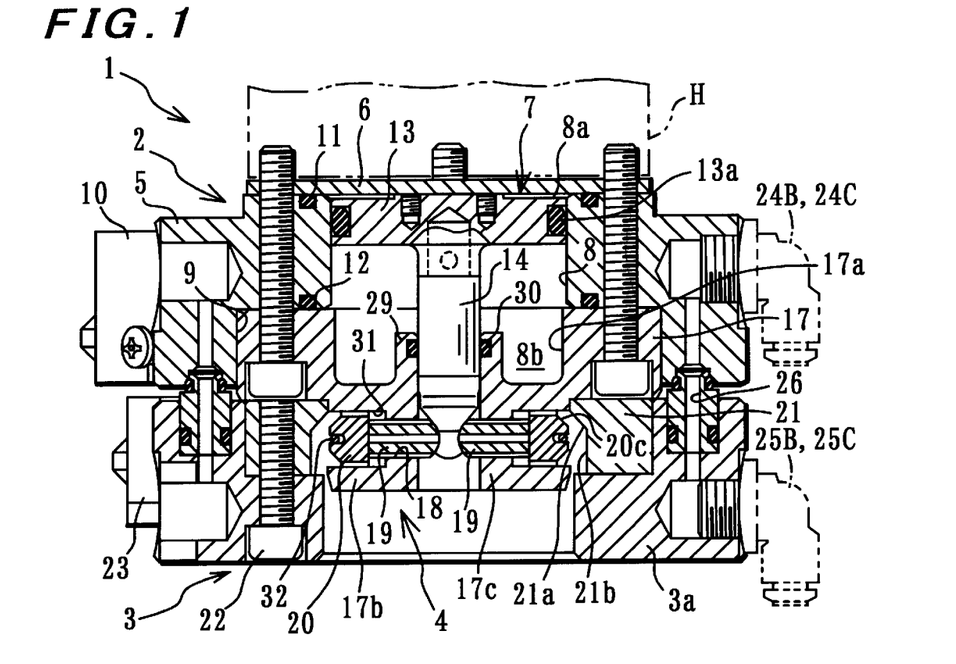
FIG. 1 is a partial cross-section of a tool linkage device of the present invention.
Figure 5:
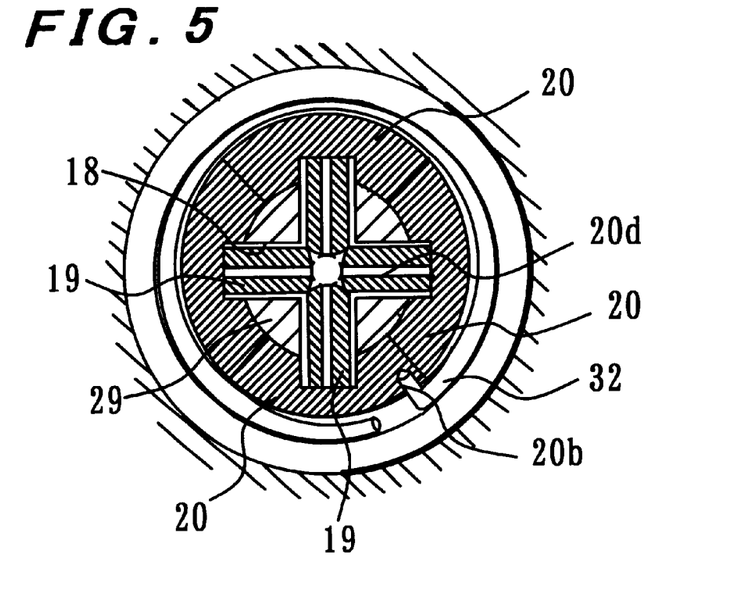
FIG. 5 is a horizontal section with an actuator shaft in a release position.

Referring to FIGS. 1 and 5, for releasing the linkage between tool plate 3 and master plate 2, pressurized air is introduced into actuation chamber 8b while the air inside actuation chamber 8a is released. Piston member 13 and actuation shaft 14 are raised to the lock release position. Thereupon, by the urging force of spring member 32, the four arc-shaped locking members 20 move inward toward a smaller radius. Arc-shaped joining surfaces 20c of arc-shaped locking members 20 separate from the tapered joining surface 21a of joining ring 21, and the linkage between tool plate 3 and master plate 2 is released.

In the prior art, a plurality of ball members as the joining member is placed over the entire perimeter. As a result of this construction, the contact portion between the ball member and the ball receiver is present only intermittently over the entire perimeter, and the contact surface pressure of the locking mechanism as a whole becomes high. However, with tool linkage device 1, because a plurality of arc-shaped locking members 20 are used as the joining member, the contact portion between arc-shaped locking members 20 and tapered joining surface 21a is present almost continuously over the entire perimeter. As a result, the contact surface pressure of locking mechanism 4 as a whole is reduced. Therefore, the life span of locking mechanism 4 is lengthened, and the durability of the device is improved.

The plurality of push rods 19 are movably attached to the plurality of rod insertion holes 18. The plurality of arc-shaped locking members 20 abutting ring-shaped groove 31 are elastically urged to a smaller radius by C-ring shaped spring member 32. As a result, loss of push rods 19 or arc shaped locking members 20 from retainer 17 is reliably prevented. Therefore, the plurality of flat springs and the like used for preventing loss of the joining member in the prior art becomes unnecessary, the number of parts is reduced, and the construction is simplified.

Arc-shaped joining surface 20c formed on arc-shaped locking member 20 is capable of surface contact with tapered joining surface 21a of joining ring 21. As a result, because its contact surface area is greatly increased compared with the contact surface area of the ball members in the prior art, the contact surface pressure required for secure attachment is reduced, and the durability of locking mechanism 4 is greatly improved. Therefore, the durability of robot hand tool linkage device 1 is greatly improved.

Next, a modification mode in which the present embodiment is partially modified is described. However, elements that are essentially the same as with the main embodiment described above are given the same numerals, and their descriptions are omitted.

1) The outer end of push rods 19 can be joined tightly with depression 20e of arc-shaped locking member 20, they can be coupled by welding, or they can be coupled using adhesives or screws, and the like. When linkage push rod 19 with arc-shaped locking member 20, depression 20e is not always necessary and may be omitted.

2) Referring to FIGS. 12–15, with tool linkage device 1A, a surface contact part 35 is formed on the portion of push rod 19A that contacts the output part of actuation shaft 14. Surface contact part 35 makes surface contact with one portion of the surface of actuation shaft 14. A pair of flat parts 36 is formed on the outer end portion of the outer perimeter surface of each push rod 19. Using flat parts 36, the outer end part of push rod 19A is fitted inside and screws together with arc-shaped locking member 20.

In other words, surface contact part 35 of push rod 19A is in stable surface contact with one part of the surface of actuation shaft 14. Otherwise, tool linkage device 1A is constructed the same as the embodiment described above.

According to tool linkage device 1A, because push rod 19A and actuation shaft 14 are in surface contact, the contact surface area is even larger than the embodiment described above, and the required surface contact pressure is further reduced. The durability of tool linkage device 1A is further improved.

3) Each push rod and arc-shaped locking member can be formed unitarily. Push rod 19A can be formed as a rod with a square cross-section. Piston member 13 and actuation shaft 14 can be formed unitarily. Joining ring 21 and tool plate body 3a can be formed unitarily. Fastening hole 20b of arc-shaped locking member 20 for fastening the spring member can be omitted. The number of push rods and their rod insertion holes is not limited to four, and, for example, can be three or more than four. The shape and placement and the like of the grease grooves of the push rods and the arc-shaped locking members can be changed. A lubricating agent other than grease can be coated in advance, or it can be supplied as needed. Various modifications may be effected therein without departing from the scope or spirit of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A robot hand tool linkage device for connecting an outer part of a robot hand to a master plate that is connected to an output part of a robot hand, comprising:

an actuation shaft supported by said master plate;

means for driving said actuation shaft between a locked position and an unlocked position;

a ring-shaped retainer affixed to said master plate surrounding an outer perimeter of said actuation shaft and including a ring-shaped groove;

a plurality of radially directed rod insertion holes formed in an inner perimeter wall;

said rod insertion holes being directed perpendicular to a motion of said actuation shaft;

a plurality of push rods attached movably in said plurality of rod insertion holes that transfer the output of said actuation shaft radially outward;

a plurality of arc-shaped locking members free to slide in a radial direction in said ring-shaped groove under urging of ends of said push rods;

annular joining ring affixed to said outer part;

an arc-shaped surface on an inner perimeter of said joining ring;

said arc-shaped surface tapering inward toward said locking members;

said arc-shaped locking members disengaging said arc-shaped surface when said locking members are in their unlock positions;

said arc-shaped locking members engaging said arc-shaped surface when said arc-shaped locking members are urged outward into their locking positions;

an arc-shaped groove is provided on an outer perimeter part of each of said plurality of arc-shaped locking members;

a C-ring shaped spring member is provided in said plurality of arc-shaped grooves; and said plurality of arc-shaped locking members are elastically urged toward a smaller diameter by said spring member.

2. A robot hand tool linkage device as claimed in claim 1, wherein:

a tapered joining surface that joins and locks with an outer perimeter surface of said plurality of arc-shaped locking members is formed on a tool plate.

3. A robot hand tool linkage device as claimed in claim 2, wherein:

when said actuation shaft is at a lock position, said plurality of arc-shaped locking members abut said tapered joining surface;

when said actuation shaft is at a release position, said plurality of arc-shaped locking members have a smaller diameter than said tapered joining surface.

4. A robot hand tool linkage device as claimed in claim 2, wherein:

an arc-shaped joining surface that can contact said tapered joining surface of said tool plate is formed at a location near an outer perimeter of said arc-shaped locking member.

5. A robot hand tool linkage device as claimed in claim 1, wherein:

a surface contact location that is in surface contact with a portion of a surface of said actuation shaft is formed on a portion of said push rod that contacts an output part of said actuation shaft.

* * * * *

UNITED STATES PATENT AND TRADEMARK OFFICE
CERTIFICATE OF CORRECTION

PATENT NO. : 6,752,037 B1
DATED : June 22, 2004
INVENTOR(S) : Hiroshi Miyazawa It is certified that error appears in the above-identified patent and that said Letters Patent is hereby corrected as shown below:

<u>Title page, Item [54] and Column 1, line 1-2,</u>
Title, please delete "TOOL CONNECTING DEVICE FOR ROBOT HAND" and substitute -- TOOL LINKAGE DEVICE FOR ROBOT HAND --.

Signed and Sealed this

Seventh Day of September, 2004

JON W. DUDAS
*Director of the United States Patent and Trademark Office*